June 30, 1959         A. B. GRÖNBERG         2,892,478
DEVICE FOR SIMULTANEOUSLY CUTTING AND CRUSHING STRAW
Filed June 29, 1956                          3 Sheets-Sheet 1

FIG. I

INVENTOR
A. B. GRÖNBERG

ATTORNEYS

June 30, 1959  A. B. GRÖNBERG  2,892,478
DEVICE FOR SIMULTANEOUSLY CUTTING AND CRUSHING STRAW
Filed June 29, 1956  3 Sheets-Sheet 3

INVENTOR
A. B. GRÖNBERG

ATTORNEYS

2,892,478

DEVICE FOR SIMULTANEOUSLY CUTTING AND CRUSHING STRAW

Anton B. Grönberg, Ottum, Sweden

Application June 29, 1956, Serial No. 594,915

Claims priority, application Sweden July 25, 1950

3 Claims. (Cl. 146—123)

This invention relates to a device for simultaneously cutting and crushing straw and is a continuation-in-part of the disclosure of application Serial No. 238,082, filed July 23, 1951, which became Patent No. 2,752,969 on July 3, 1956.

It is well known that straw can be broken up by cutting it crosswise in order to facilitate storage and to prepare it for chemical treatment. Further, experiments have shown that simultaneously cutting and crushing the straw increases the desired effect and renders the so-prepared straw resistant to rotting in storage.

The devices of the present invention comprise cutting members, which perform in addition to the cutting, one part of the desired crushing and other means for crushing the straw in such a way that the fibers are torn off in a longitudinal direction.

An object of the invention is to provide a device for the simultaneous cutting and crushing of straw.

Another object of the invention is to provide a device whereby it is possible to obtain a crosswise cutting of the straw in relation to the longitudinal direction of said straw simultaneous with the crushing of said straw.

Other objects and features will be apparent from the following detailed description.

Figure 1:
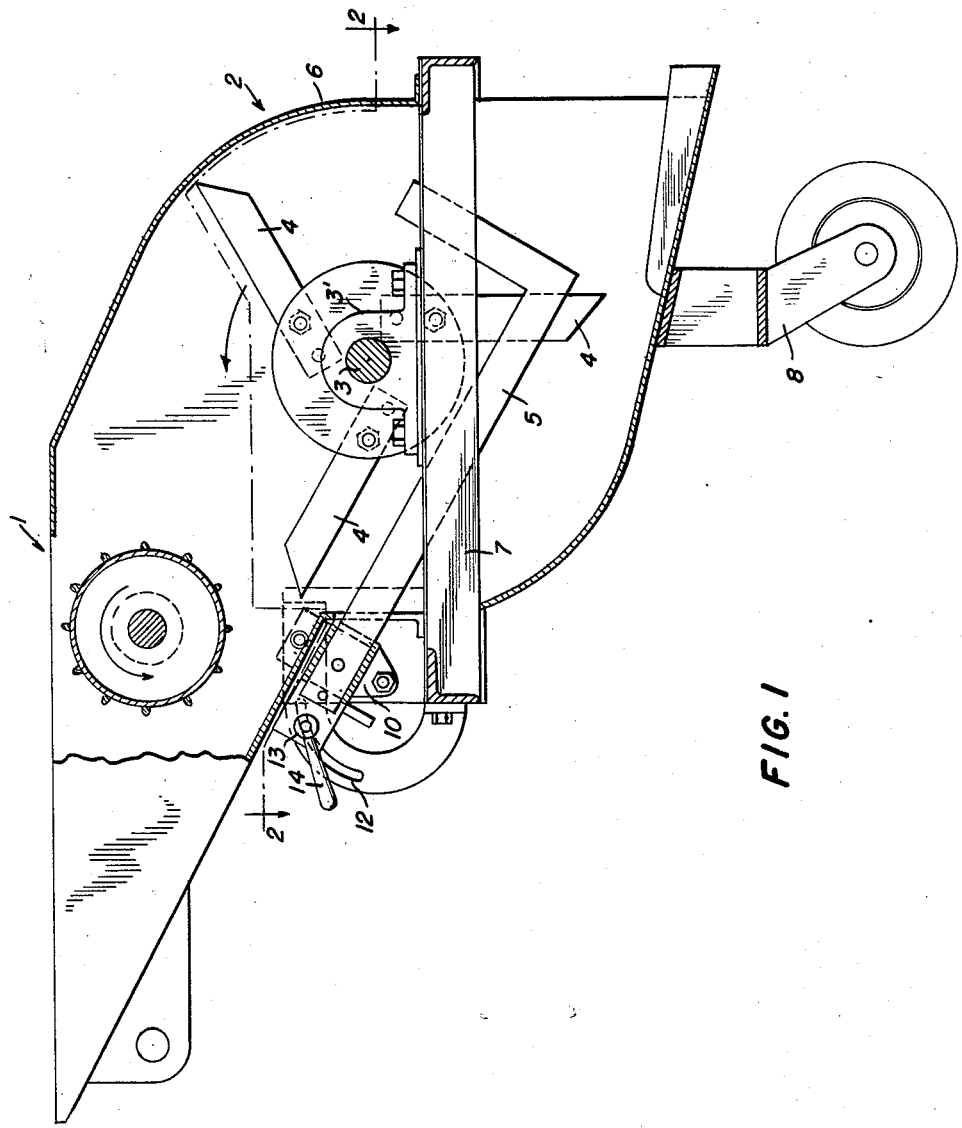
Figure 1 is a vertical view in section on line 1—1 of Figure 2 of a trailer which may be coupled to a reaping thresher and which is provided with a cutting and crushing device.

In the drawings 1 indicates the hopper to which straw from a threshing machine, such as the threshing machine of a combine, is delivered. Numeral 2 indicates a cutting apparatus in accordance with the invention, intended for cutting the straw coming from the straw discharge of the threshing machine via hopper 1 the straw being cut by this device into comparatively short pieces. The cutting apparatus 2 supported by a caster wheeled frame 7, 8 includes a rotor comprising a revolving power driven shaft 3, on which blades 4 are fastened, and stationary arms 5 are provided which serve as a counter for the straw and between which the rotor blades 4 pass when revolving. The rotor shaft 3 is carried by bearings 3' at the ends, and if necessary at the center, of a casing 6 forming the outer cover of cutting apparatus 2. Casing 6 has an inlet opening from hopper 1. Frame 7 supports casing 6 and bearings 3'.

When the cutting apparatus 2 is attached in position to receive the straw from the straw outlet of a combine, the bottom of the casing 6 may be provided with a spreading device for the cut straw, so that the latter is spread in a direction transverse to that of the direction of movement of combine. The spreading device is constructed so as to place the cut straw upon a field in substantially the same width as the length of the cutting apparatus of the combine. It is to be understood that the field thus obtains an equally spread layer of cut straw, which can later be ploughed in, which of course will be facilitated by the fact that the straw has been cut into short pieces. Moreover, in this way a quicker rotting of the straw is obtained and the soil is improved in relatively shorter time and this at no large cost.

It is an essential feature of this invention that the rotor shaft 3 be substantially perpendicular to the direction in which the straw is conveyed. In this connection it should be mentioned that tests have shown that the straws are cut not only perpendicular to the longitudinal direction of the fibre but also along it, which results in the straw rotting very much sooner when it has been ploughed in. It does not matter if the straw is conveyed to the cutting apparatus perpendicular to its longitudinal direction or parallel to the latter; the threshing machine thus need not be provided with guiding devices for the conveyance of the straw in a certain relation to its lognitudinal direction.

The counter arms 5 are arranged at intervals each considerably greater than the thickness of the rotor blades 4. The cutting apparatus according to the invention works considerably more favorably when the counter arms are arranged in this way, owing to the fact that the arms, when the apparatus is operative, can swing sideways, thereby striking against each other if the interval between the non-revolving arms is not sufficiently large. Owing to the fact that there is an interval between the adjacent sides of the blades 4 and arms 5, small objects, such as stones, may pass between the arms without damaging the latter.

Figure 2:
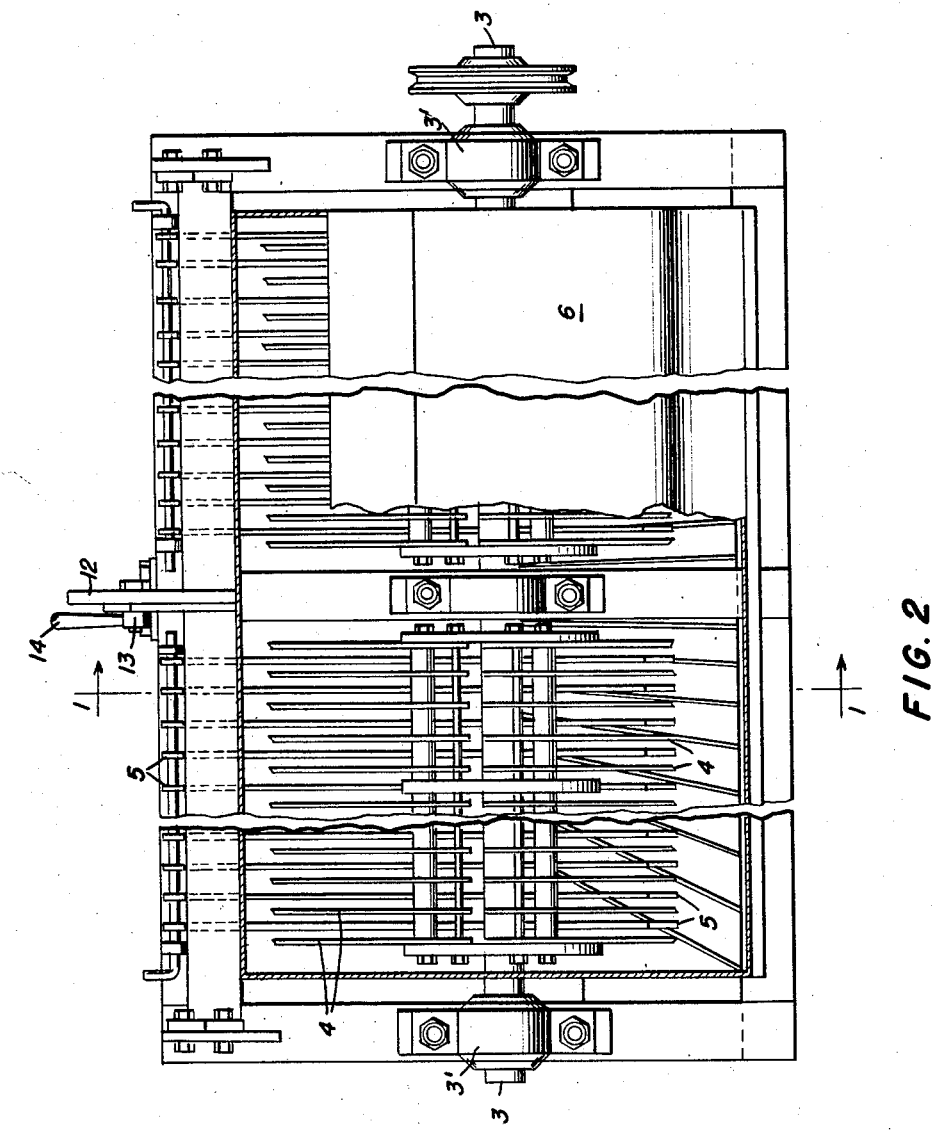
Figure 2 is a fragmentary plan, partly in section on line 2—2 of the device of Figure 1.

From Figures 1 and 2 it will be clearly seen than each of the counter arms 5 is attached to the front side-wall of the casing 6 only at one end, the arm 5 being otherwise quite free. The rotor shaft 3 is placed parallel to the free ends of the counter arms 5, arranged in a line, and the rotor shaft 3 lies at such a distance from the free ends of the counter arms 5 that there is an intervening space between the shaft 3 and the abovementioned ends.

Figure 3:
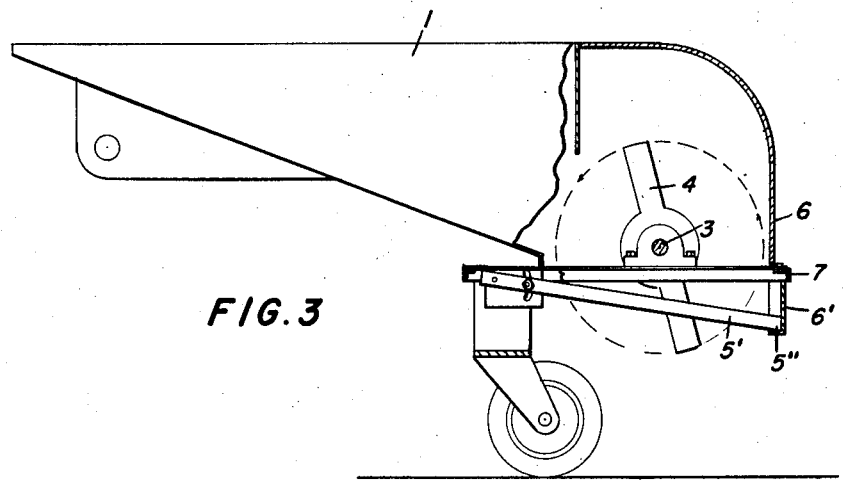
Figure 3 is a simplified view similar to Figure 1 showing a different form of the stationary arms.

According to the invention as seen in Figure 3, it is, however, possible for each counter arm 5' to be fixed to the casing 6 at both ends in such a way that one end is attached to the front sidewall, whereas the other end is attached to the back side-wall of the casing at 6'. In this case the rotor shaft 3 is placed above the grating, formed by the counter arms 5', the shaft being suitably placed at some distance from the grating.

In the device of Figure 3 the arms 5' are straight from end to end. In this case, they may be secured at their rear end by an element 5" such as an angle bar.

In the way of carrying out the invention shown in Figures 1 and 2, the blades 4 and arms 5—at the edges intended for cooperation with the straw—have been provided with cutting edges; but tests have shown that in certain cases it is sufficient to provide only the rotor arms 4 or the counter arms 5 with cutting edges. For special purposes, for instance when an essential crushing of the straw is required, it is also possible to leave out the cutting edges of the arms, the thickness of which may vary from very thin to comparatively thick material.

The counter arms may be adjusted to different angular positions in a plane perpendicular to the rotor shaft. The object of this is to enable the grating, formed by the arms 5, to be adjusted in different positions with regard to the direction in which the straw transported towards the grating, is moving so that the position of the grating is changeable and may be adapted to different needs, depending on for instance the quality of the straw.

The arms 5 may be conveniently mounted by a holder element 10 pivotally mounted on the forward side of frame 7 beyond the arc of the ends of blades 4. This holder element 10 is provided with a plurality of spaced recesses 11 into which the ends of arms 5 may be placed and held securely in position by any suitable securing means. Holder element 10, moreover, is secured in angular adjusted relation with the blades 4 by any suitable means such as sector 12 and bolt 13 which may be securely tightened by handled nut 14. In other words, the counter arms 5 are angularly adjustable by turning the same on an axis located adjacent the inlet.

Figure 4:
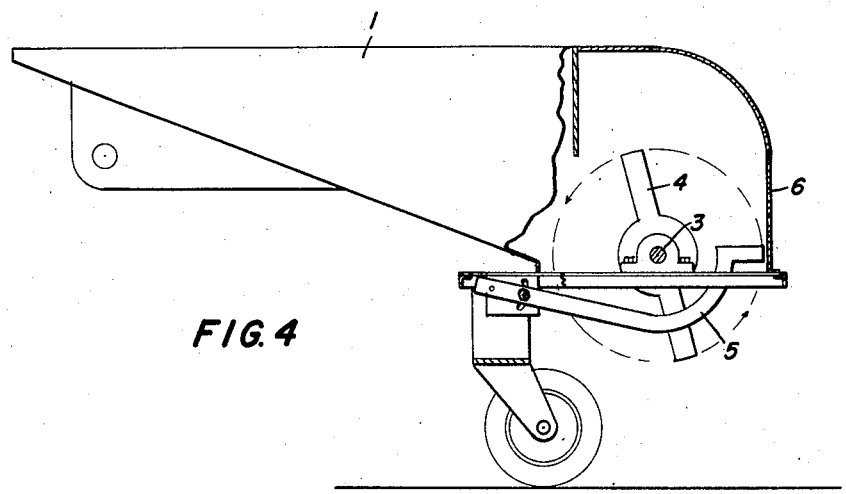
Figure 4 is a simplified view similar to Figure 1 showing yet another form of the stationary arms.

The blades shown in Figure 4 are similar to those shown in Figure 1 except that instead of being angular, they are formed with a spiral curve to give at each part of the arm the most suitable working angle. Arms 5 are, in this case, curved in such a way that for each position of blades 4 the angle between the blades and the arms is less than 90°.

I claim:

1. In a device for cutting and crushing straw, a casing, means defining an inlet in the casing for receiving the straw, a hopper above the casing adapted to feed straw into said casing through the inlet, a plurality of spaced arms extending into the casing, means mounting the arms for angular adjustment by rotation on an axis adjacent the inlet in the casing to a plurality of different operative fixed positions, a power driven rotating shaft above the arms and at right angles thereto, a plurality of sets of blades mounted on the said shaft so as to pass between the arms, and a cutting edge on each arm and each blade to facilitate the cutting operation, the adjustability of the arms serving to adjust the angle at which the blades strike straw supported by the arms, each of said arms being arranged in the space half-way between adjacent cutting blades.

2. The device of claim 1 in which said arms are L shaped, the end of the L extending upwardly on the side of said rotating shaft remote from said hopper.

3. The device of claim 1 in which the said arms, each include a portion formed in a generally spiral curve extending upwardly between said blades to give at each part of the arm the most suitable working angle.

References Cited in the file of this patent

UNITED STATES PATENTS

| | | |
|---|---|---|
| 52,199 | Price | Jan. 23, 1866 |
| 1,259,089 | Felcyn | Mar. 12, 1918 |
| 1,440,429 | Williams | Jan. 2, 1923 |
| 2,137,388 | Chapman | Nov. 22, 1938 |
| 2,281,846 | Klein | May 5, 1942 |
| 2,554,669 | Elofson | May 29, 1951 |
| 2,670,775 | Elofson | Mar. 2, 1954 |

OTHER REFERENCES

| | | |
|---|---|---|
| 641,433 | France | Apr. 16, 1928 |
| 888,258 | France | Aug. 30, 1943 |